United States Patent [19]

Fischell

[11] 4,408,390

[45] Oct. 11, 1983

[54] APPARATUS AND PROCESS FOR NESTING DRUM BODIES

[76] Inventor: Norman L. Fischell, 8 Foothill Dr., Kinnelon, N.J. 07405

[21] Appl. No.: 229,133

[22] Filed: Jan. 28, 1981

[51] Int. Cl.³ .......................................... B23P 19/00
[52] U.S. Cl. ...................................................... 29/822
[58] Field of Search ................ 100/232, 902; 72/367, 72/381, 383, 386, 389; 29/515, 822; 206/517; 493/298, 311, 457, 448, 449

[56] References Cited

U.S. PATENT DOCUMENTS

| | | | |
|---|---|---|---|
| 1,886,171 | 11/1932 | Dodge et al. | 206/517 |
| 2,291,755 | 8/1942 | Pierce | 206/517 |
| 2,654,473 | 10/1953 | Pierce | 206/517 |

Primary Examiner—Ervin M. Combs
Assistant Examiner—Steven E. Nichols
Attorney, Agent, or Firm—L. E. Marn; E. M. Olstein

[57] ABSTRACT

There is disclosed a novel apparatus and process for nesting a plurality of drum bodies or shells of deformable material wherein a cylindrically-shaped drum body is subjected to a force in a plane substantially parallel to the axis of the drum body to deform the drum body to the extent necessary to permit the positioning of a second drum body about the initially deformed drum body whereupon the deforming procedure is repeated for the nested first and second drum bodies, and is thereafter again repeated until a desired number of drum shells are contained in the resulting nested assemblage of drum bodies or shells.

9 Claims, 5 Drawing Figures

4,408,390

APPARATUS AND PROCESS FOR NESTING DRUM BODIES

FIELD OF INVENTION

This invention relates to a novel apparatus and process for handling drum bodies, and more particularly to a novel apparatus and process for collating a plurality of drum bodies or shells into nested relationship.

BACKGROUND OF THE INVENTION

Containers, such as steel drums, for the storage and transportation of solids and/or liquid, are generally manufactured by affixing top and bottom members to a drum shell or body with the resulting assembled drum being shipped as an empty container to user location. The transportation of assembled drums involves substantial freight charges due to the void volume of the empty containers.

OBJECT OF THE INVENTION

It is an object of the invention to provide a novel apparatus and process for the nesting of drum bodies or shells.

A further object of the present invention is to provide a novel apparatus and process for the nesting of drum bodies or shells for shipment to user location for assembly into finished drums.

Another object of the present invention is to provide a novel apparatus and process for readily effecting and nesting of drum bodies or shells in a manner to permit fascile restoration of each drum body for drum assembly at user location.

Yet another object of the present invention is to provide a novel apparatus and process for the nesting of drum bodies or shells for the savings in transportation costs of empty assembled drums.

A still further object of the present invention is to provide a novel apparatus and process for the nesting of drum bodies or shells after removal of the drum covers and bottoms which drum bodies having been previously used for the shipment of goods.

SUMMARY OF THE INVENTION

These and other objects of the present invention are achieved by a novel apparatus and process for the nesting of drum bodies or shells of deformable material wherein a cylindrically-shaped drum body is subjected to a force in a plane substantially parallel to the axis of the drum body to deform the drum body to the extent necessary to permit the positioning of a second drum body about the initially deformed drum body whereupon the deforming procedure is repeated for the nested first and second drum bodies and is thereafter repeated until a desired number of drum shells are contained in the resulting nested assemblage of drum bodies or shells.

BRIEF DESCRIPTION OF THE DRAWINGS

A better understanding of the present invention as well as other objects and advantages thereof will become apparent upon consideration of the detailed disclosure thereof, especially when taken with the accompanied drawings wherein like numerals designate like parts theroughout, and wherein.

DETAILED DESCRIPTION OF THE DRAWING

Figure 1:
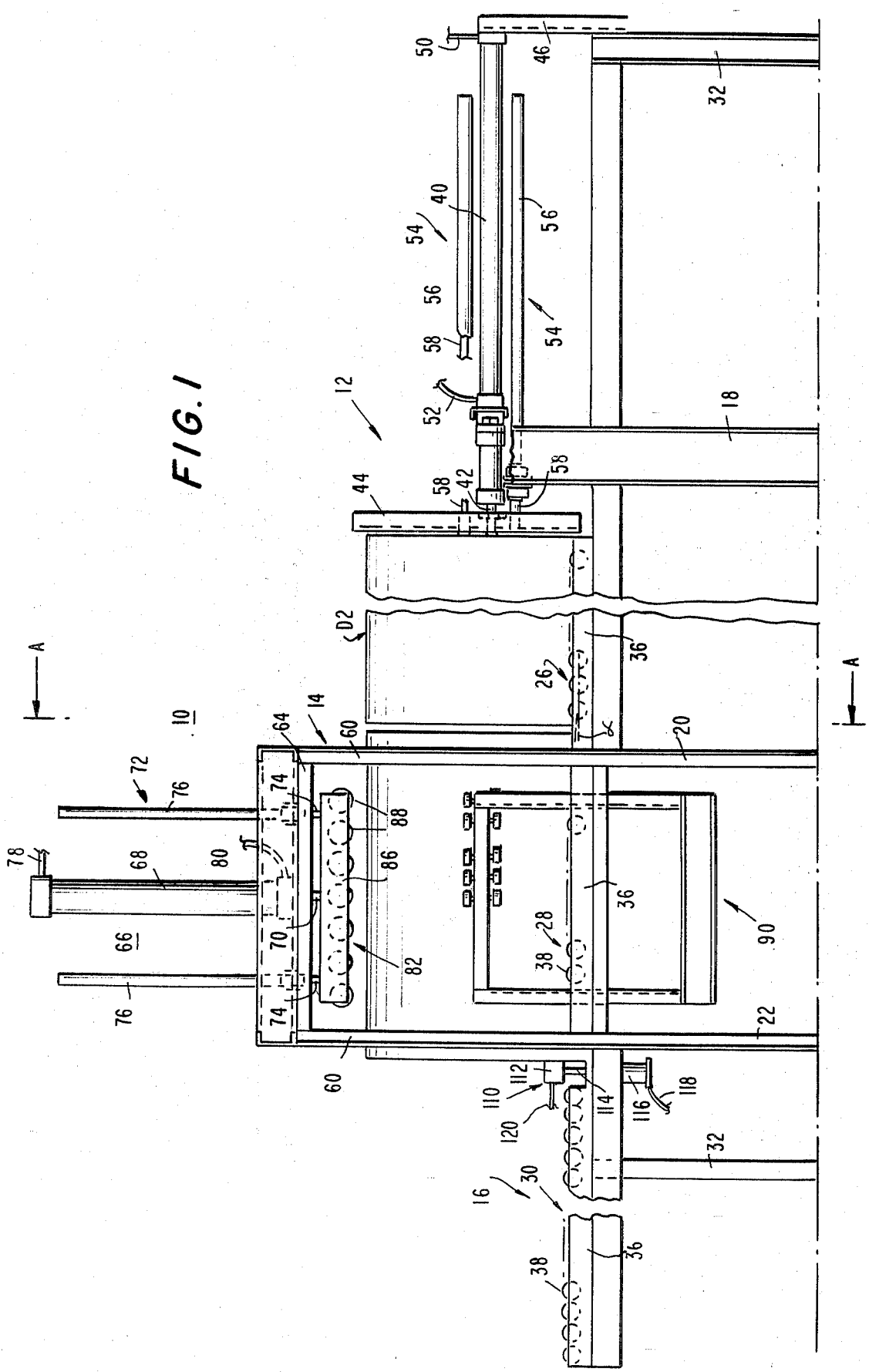
FIG. 1 is an elevational view of the apparatus of the present invention.
Figure 2:
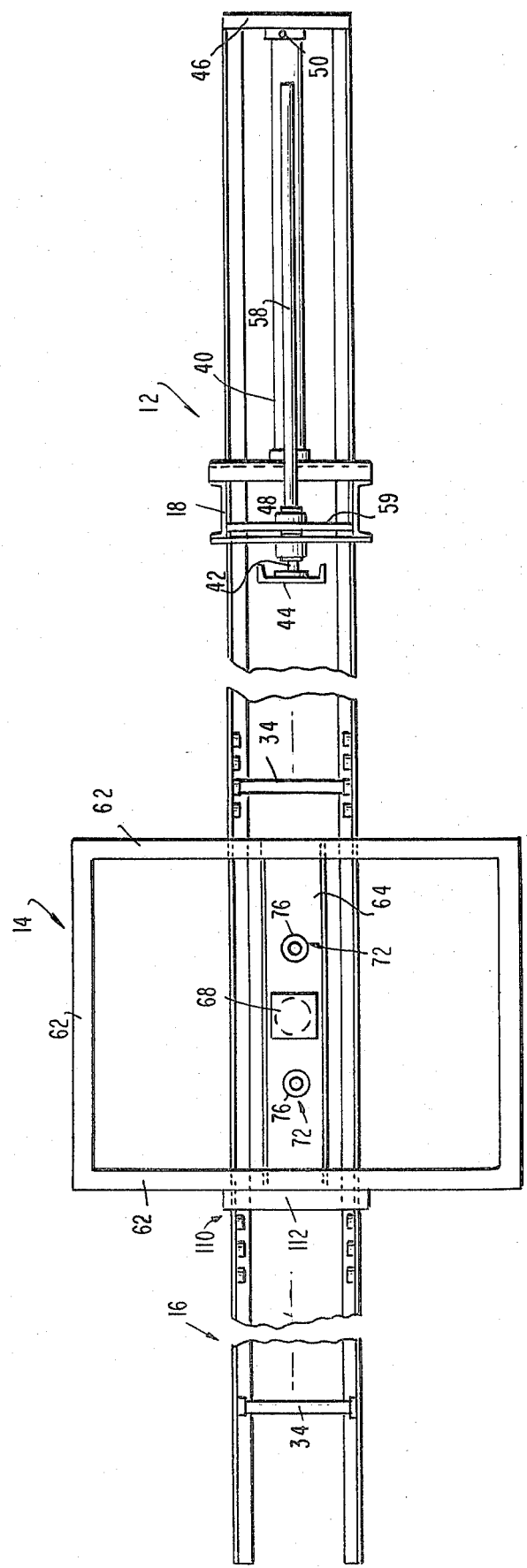
FIG. 2 is a plan view thereof.

Referring now to the drawings and particularly FIGS. 1 and 2, there is illustrated a drum body nesting assembly, generally indicated as 10, and comprised of a drum body feeding station, a drum body deformation and nesting station and a nested drum bodies discharge station, generally indicated as 12, 14 and 16, respectively.

The drum body nesting assembly 10 is positioned on a suitable foundation and is comprised of a plurality of vertically-disposed support members, 18, 20 and 22 to which are mounted, such as by welding, a plurality of horizontally-disposed cross support members 24. The drum body feed station 12, the drum body deformation and nesting station 14, and the nested drum bodies discharge station 16 are provided with roller assemblies, generally indicated as 26, 28 and 30, respectively, mounted to vertically-disposed support legs 32 and cross support members 34, and comprised of parallelly-disposed rails 36 on which are mounted a plurality of rollers 38. The last few rollers 38 of the drum body feed station 12 are disposed at a slight incline to the level of the rollers 38 of the drum body deformation and nesting station 14, as illustrated by the angle α, for reasons as more fully hereinafter described.

The drum body feed station 12 includes a hydraulic or air cylinder 40 including cylinder rod 42 affixed to a piston thereof (not shown) and to a vertically disposed pusher plate member 44. The end of the hydraulic cylinder opposite the rod end is mounted to a vertically-disposed end support member 46 with the rod end thereof being mounted to a horizontally-disposed support member 48 mounted to the verticlally-disposed support members 18. The cylinder 40 is provided with lines 50 and 52 to be placed in fluid communication with a source of pressurized fluid, as hereinafter more fully described. Head and guide shaft assemblies, generally indicated as 54, comprised of a bushing 56 and a shaft 58 are mounted above the hydraulic cylinder 40 with the bushings 56 being affixed to a plate 59 mounted to the support members 18 with the shafts 58 affixed to the pusher plate member 44.

The drum deformation station 14 is comprised of vertically-disposed members 60 and horizontally-disposed member 62 mounted on support members 20 and 22 with the horizontally-disposed members 62 supporting a platform 64 for a vertically-disposed deformation assembly, generally indicated as 66. The platform 64 is mounted to the horizontally-disposed members 62, such as by welding. To the platform 64, there is mounted hydraulic or air cylinder 68 including a rod 70 mounted to a piston (not shown), and head and guide shaft assemblies, generally indicated as 72, of the deformation assembly 66. The head and guide shaft assemblies 72 are comprised of a shaft 74 slidably positioned within a bushing 76 mounted to the platform 64. The cylinder 68 is provided with lines 78 and 80 to be placed in fluid communication with a source of fluid pressure, as more fully hereinafter described.

Below the platform 64, there is provided a drum deformation assembly, generally indicated as 82, comprised of an elongated plate member 84, disposed generally parallel to the axis of the drum body nesting assembly 10, to which are mounted parallel plate elements 86 for mounting rollers 88, as more clearly seen in FIGS. 3 to 5. The drum deformation assembly 82 is mounted to the rod 70 mounted to a piston (not shown) of the hydraulic or air cylinder 68 and to the shafts 74 of the head and guide shaft assemblies 72. The drum deformation assembly 82 is positioned generally in axial alignment with the center line of a drum shell to be deformed, and preferably in a substantially-vertical plane with the axis thereof, as more fully hereinafter discussed.

Figure 3:
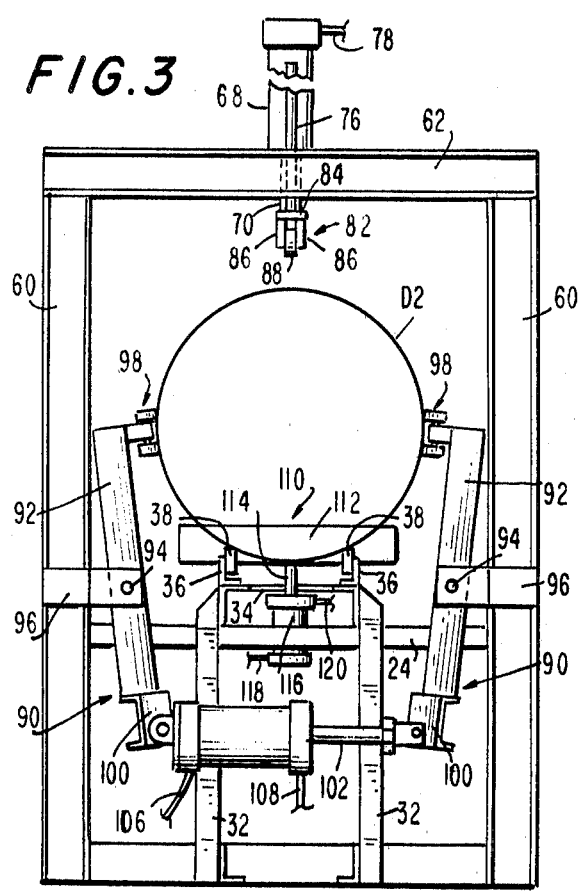
FIG. 3 is a cross-sectional view taken along the lines A—A of FIG. 1 illustrating initial positioning of a drum body or shell.
Figure 4:
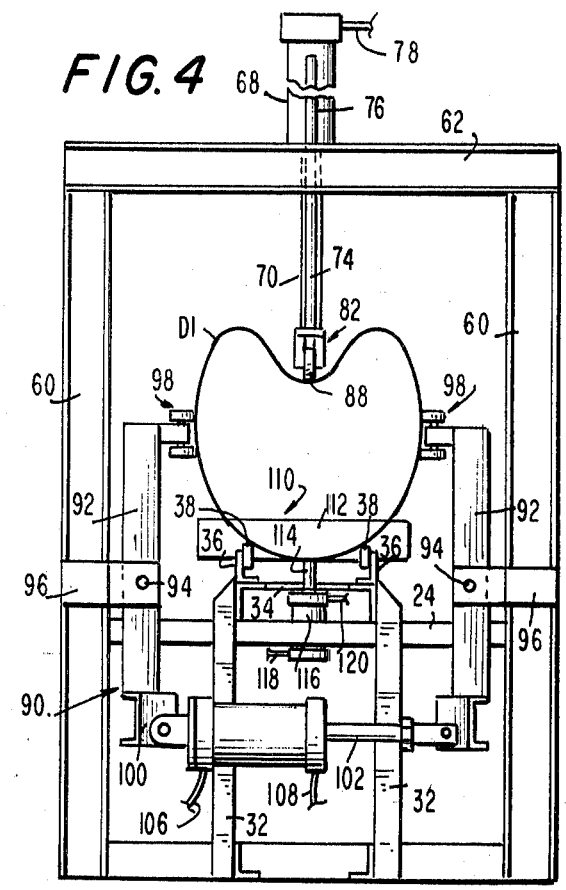
FIG. 4 is a cross-sectional view taken along the lines A—A illustrating partial deformation of the drum body or shell.
Figure 5:
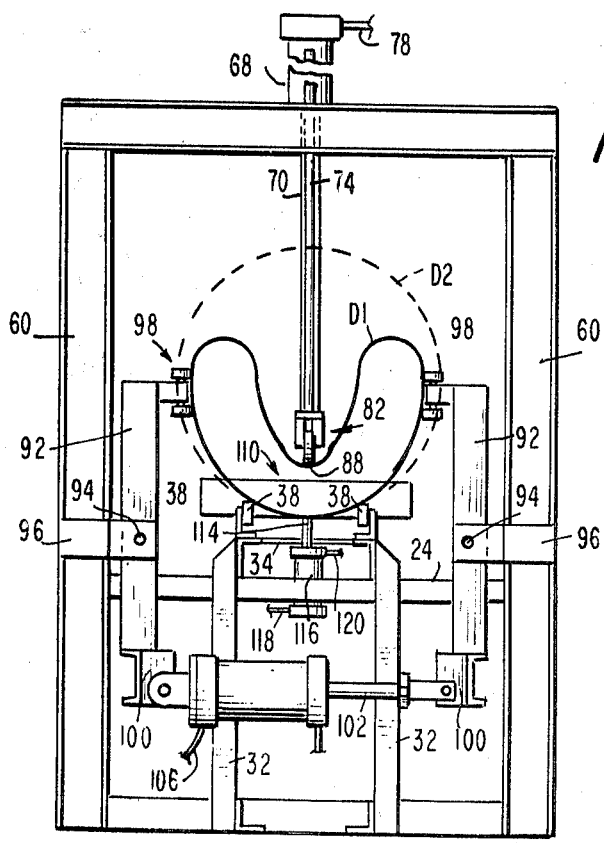
FIG. 5 is a cross-sectional view taken along the lines A—A illustrating the drum body or shell in substantially deformed state.

Referring now to FIGS. 3 to 5, the drum body deformation and nesting assembly 14 includes side deformation assemblies, generally indicated as 90, mounted on both sides of the roller assembly 28 and comprised of vertically-disposed I-beam members 92 hingeably-mounted, such as by shafts 94, to side support elements 96 mounted to vertically-disposed members 60. The upper end of the side deformation assemblies 90 is provided with a roller assembly, generally indicated as 98, with the lower end thereof being mounted by arm member 100 to rod members 102 mounted to a piston (not shown) of a hydraulic or air cylinder 104 mounted to the vertically-disposed support leg 32. The cylinder 104 is provided with lines 106 and 108 to be placed in fluid communication with a source of pressuized fluid, as more fully hereinafter described.

As illustrated in FIG. 3, the roller assembly 98 of the side deformation assemblies 90 in a rest position are spaced apart a distance slightly greater than the diameter of the drum to be deformed.

Between the drum deformation and nesting station 14 and the nested drum bodies discharge station 16, there is provided a drum stop assembly, generally indicated as 110, referring now to FIG. 1, and comprised of a vertically-disposed bar element 112 mounted on a rod 114 mounted to a piston (not shown) of a hydraulic or air cylinder 116 having lines 118 and 120 to be placed in fluid communication with a source of pressurized fluid, as more fully hereinafter described.

In operation, referring now to FIGS. 3 to 5, a first drum shell or body $D_1$ to be deformed is positioned on the roller assembly 28 of the drum body deformation and nesting station 14 with line 118 of the cylinder 116 placed in fluid communication with pressurized fluid to cause the bar element 112 of the drum stop assembly 110 to be raised to the position indicated in FIG. 3. When the drum $D_1$ is suitably positioned within the drum body deformation and nesting assembly 14 and against the bar element 112, the rod 70 of the cylinder 68 is caused to activated by the introduction of a pressurized fluid through line 78 into the cylinder 68 to cause the drum deformation assembly 82 to be lowered into contact with the drum $D_1$ and through the plane of the shell of the drum body and thus to be deformed, as illustrated in FIG. 4.

Pressurized fluid is introduced by line 106 into the cylinder 104 to cause the rod members 102 thereof to exert an outward force on the I-beam members 92 and thence to rotate about the shafts 94 thereby to cause the roller assemblies 98 of the side deformation assemblies 90 to come into contact with the sides of the drum shell $D_1$ being deformed. The drum deformation member 82 is caused to continue in a downward motion to a position of substantially final deformation, such as illustrated in FIG. 5.

Thereupon, a subsequent drum body or shell $D_2$ is positioned on the roller assembly 26 on the drum body feed station 12. Line 50 of the cylinder 40 is placed in fluid communication with pressurized fluid to cause the rod 42 to be activated and thus cause the end plate member 44 to be moved from right to left, as seen in FIG. 1. The end of the roller assembly 26 of the drum body feed station 12, as hereinabove discussed, is provided with rollers 38 disposed at a slight incline (angle $\alpha$) to permit the subsequent drum body $D_2$ to be slid over the leading edge portion and thus over the periphery of the deformed drum body $D_1$ in the drum deformation and nesting stations 14, as illustrated by the dotted lines in FIG. 5. Once a portion of the drum body $D_2$ is positioned about the deformed drum body $D_1$, the restraint of the drum body $D_2$ is sufficient to maintain the drum body $D_1$ in a deformed state thereby permitting withdrawal of the line deformation force provided by drum deformation assembly 82 and the side deformation assemblies 90.

Withdrawal of the drum deformation assembly 82 is effected by placing line 80 of the cylinder 68 in fluid communication with pressurized fluid simultaneously venting line 78 thereof thereby causing rod 70 of the cylinder 68 to be retracted into the cylinder 68 and thus retraction of the drum deformation assembly 82. Simultaneously, or subsequent to the retraction of the drum deformation assembly 82, line 108 of the cylinder 104 is placed in fluid communication with a source of pressurized fluid simultaneously venting line 106 to cause rod members 102 to be retracted into the cylinder 104 and thus the side deformation assemblies 90 to rotate about shafts 94 and resume a rest position, as illustrated in FIG. 3.

To complete positioning of the drum body $D_2$ about the deformed drum body $D_1$, the plate member 44 mounted to the rod 42 as well as the guide shafts 58 are caused to be further moved from right to left to a point where the leading edge of the drum body $D_2$ is caused to contact the bar element 112 whereupon line 52 of the cylinder 40 is placed in fluid communication with presurized fluid simultaneously venting line 50 thereby causing retraction of the rod 42 of the cylinder 40 and thus retraction of the plate member 44.

Thereafter, deformation of the drum body $D_2$ about the deformed drum $D_1$ is effected in a manner similar to the procedure hereinabove described. Such procedure is effected for up to about 20 drum bodies or more depending upon drum size, materials of construction, etc.

After assembly of the desired number of drum bodies to a nested drum assembly (e.g. 20 drums of 18 gauge steel of 22 inches in diameter), line 120 of the cylinder 116 is placed in fluid communication with pressurized fluid simultaneously venting line 118 thereby causing the bar element 112 of the stop assembly 110 to be lowered thereby permitting removal of a nested drum assembly (not shown) on the rail assembly 30 of the nested drum bodies discharge station 16.

While the instant invention has been described with reference to the nesting of newly formed drum bodies for shipment to user location for eventual assembly into completed drum assemblies, it is contemplated that the apparatus and process of the instant invention may be used to nest drum bodies which have been in use with removal of end cover and bottom element prior to nesting.

Additonally, while the present invention is described in connection with the nesting of drum bodies formed of 18 to 20 gauge steel, it is understood that the process and apparatus of the present invention may be applied to drum bodies formed of diverse plastic materials, provided such materials exhibit the necessary properties of deformation and resiliency to resume their original shapes. It will be understood that the terms deformation or deformed drum body is used in the context of permanent deformation or temporary deformation whereby a deformed drum body needs some restorative force or will return to a substantially cylindrical shape once the restraint of another drum body surrounding a deformed drum body is removed. Additionally, while the present invention has been described with the use of side deformation assemblies, certain materials of construction may result in a drum body which will deform in a manner to permit positioning of a second drum body thereabout requiring only the force of the drum deformation assembly 82, i.e. side deformation assemblies are not required. Further, while the present invention has been described generally in a vertical mode or position, it will be understood that the assembly thereof may be in a plane other than vertical.

While the invention has been described in connection with one embodiment thereof, it will be understood that many modifications will be apparent to one of ordinary skill in the art and that this application is intended to cover any adaptation or variation thereof, therefore, it is manifestly intended that this invention be only limited by the claims and the equivalence thereof.

What is claimed:

1. An apparatus for nesting drum bodies which comprises:
   a drum body deformation assembly including means for positioning a drum body therein;
   a linear deformation assembly;
   means for moving said linear deformation assemblies through said drum body substantially towards an axis of said drum body to effect deformation of said drum body;
   drum body feeding assembly including means for moving another drum body about said deformed drum body to a point coextensive with the said deformed drum body; and
   means for withdrawing nested drum bodies from said assembly.

2. The apparatus for nesting drum bodies as defined in claim 1 and including a stop assembly to restrain said deformed drum body in said drum body deformation assembly during positioning of said another drum body.

3. The apparatus for nesting drum bodies as defined in claim 1 wherein said means for moving said linear deformation assembly is a fluid cylinder assembly.

4. The apparatus for nesting drum bodies as defined in claim 1 wherein said linear deformation assembly includes a plurality of rollers lineally-positioned in elongated bar members mounted to a rod member of said fluid cylinder assembly and wherein said linear deformation assembly is caused to move in a plane substantially towards said axis of said drum body.

5. The apparatus for nesting drum bodies as defined in claim 1 and including side retaining members and means for moving said side retaining members towards each other thereby applying side deformation forces to said drum body being deformed.

6. The apparatus for nesting drum bodies as defined in claim 5 where said side retaining members exert said side deformation forces in a plane parallel to said axis of said drum body.

7. The apparatus for nesting drum bodies as defined in claim 5 wherein said means for moving said side retaining members includes a fluid cylinder assembly.

8. The apparatus for nesting drum bodies as defined in claim 1 wherein said means for moving said another drum body about said deformed drum body includes a fluid cylinder assembly.

9. The apparatus for nesting drum bodies as defined in claim 1 wherein said drum body feeding assembly includes inclined rollers for assisting in placement of said another drum body about said deformed drum body.

* * * * *